(12) United States Patent
Mustafa

(10) Patent No.: US 12,513,066 B2
(45) Date of Patent: Dec. 30, 2025

(54) SECURITY MODE ENHANCEMENT FOR CONNECTIVITY FAULT MANAGEMENT (CFM)

(71) Applicant: Ciena Corporation, Hanover, MD (US)

(72) Inventor: Ghulam Mustafa, Aligarh (IN)

(73) Assignee: Ciena Corporation, Hanover, MD (US)

( * ) Notice: Subject to any disclaimer, the term of this patent is extended or adjusted under 35 U.S.C. 154(b) by 75 days.

(21) Appl. No.: 18/769,095

(22) Filed: Jul. 10, 2024

(65) Prior Publication Data

US 2024/0364607 A1    Oct. 31, 2024

Related U.S. Application Data

(63) Continuation of application No. 17/559,900, filed on Dec. 22, 2021, now Pat. No. 12,040,960.

(30) Foreign Application Priority Data

Nov. 9, 2021  (IN) .............................. 202111051296

(51) Int. Cl.
*H04L 43/0811* (2022.01)
*H04L 41/069* (2022.01)

(52) U.S. Cl.
CPC ........ *H04L 43/0811* (2013.01); *H04L 41/069* (2013.01)

(58) Field of Classification Search
None
See application file for complete search history.

(56) References Cited

U.S. PATENT DOCUMENTS

| | | | |
|---|---|---|---|
| 7,809,354 B2 * | 10/2010 | Calhoun | H04L 63/126 455/410 |
| 8,683,028 B2 | 3/2014 | Davison et al. | |
| 9,537,846 B2 | 1/2017 | Saxena et al. | |
| 9,602,374 B2 | 3/2017 | Saxena et al. | |
| 10,623,293 B2 | 4/2020 | Hu et al. | |
| 2013/0101291 A1 * | 4/2013 | Wittenschlaeger | H04L 45/02 370/254 |
| 2019/0173739 A1 | 6/2019 | Cui et al. | |
| 2020/0076726 A1 | 3/2020 | Seth et al. | |
| 2020/0099568 A1 | 3/2020 | Baheri et al. | |
| 2020/0177638 A1 * | 6/2020 | Salman | H04L 63/14 |

* cited by examiner

*Primary Examiner* — Robert M Morlan
(74) *Attorney, Agent, or Firm* — Baratta Law PLLC; Lawrence A. Baratta, Jr.

(57) ABSTRACT

Systems and methods for enhancing the Connectivity Fault Management (CFM) protocol defined in IEEE 802.1Q are provided. In particular, a method includes receiving one or more messages associated with a link connectivity protocol that for detecting link connectivity issues of an Ethernet service in a section of a network and responding to the link connectivity issues; and maintaining two databases for learning nodes in the network based on the received one or more messages, the two databases including an active database and an isolated database.

20 Claims, 4 Drawing Sheets

SECURITY MODE ENHANCEMENT FOR CONNECTIVITY FAULT MANAGEMENT (CFM)

CROSS-REFERENCE

The present disclosure is a continuation of U.S. patent application Ser. No. 17/559,900, filed Dec. 22, 2021, which claimed priority to Indian Patent Application No. 202111051296, filed Nov. 9, 2021, the contents of each are incorporated by reference in their entirety.

TECHNICAL FIELD

The present disclosure generally relates to networking systems and methods. More particularly, the present disclosure relates to the Connectivity Fault Management (CFM) protocol and enhancements to CFM to enable the operation of Maintenance Association End Points (MEPs) in a safety mode to counteract malicious attacks.

BACKGROUND

The Institute of Electrical and Electronics Engineers (IEEE) provides protocols for managing faults in communications networks. For example, the Connectivity Fault Management (CFM) protocol, defined in IEEE 802.1Q, provides standardized practices for Network Management Systems (NMSs) and Operations, Administration, and Maintenance (OAM) systems to handle connectivity issues. CFM defines Maintenance Associations (MAs) within a section of a network, Maintenance-association End Points (MEPs) operating at the edges of these MAs, and various identification and control aspects for defining the transmission and reception of Connectivity Check Messages (CCMs) between the MEPs within the MA. CFM also defines how the MEPs are configured to handle these CCMs, once received, for diagnosing connectivity faults and remediating these faults as appropriate.

In particular, the CFM protocol includes a Continuity Check Protocol (CCP) used for communicating the CCMs, which can be used by the MEPs to detect connectivity faults. The CCMs may be referred to as "heartbeat" messages for the CFM protocol. Each MEP may be configured to periodically transmit a multicast CCM inwardly within the MA toward other MEPs. When a connectivity fault is detected, the CCMs can help to provide faster switching to an alternate path or protection path within the network.

Thus, CFM is a protocol that can be used in Ethernet networks for detecting, verifying, and isolating connectivity failures. However, there is a security vulnerability based on the way in which CFM end-points (i.e., MEPs) are designed. Specifically, these MEPs are usually designed as receivers that are "always on." Therefore, when they receive CCMs from a MEP present on a device that is assumed to be a trusted peer device, the MEP receiver is configured to record the CCMs in a database (e.g., referred to as MEP CCM Database or Remote MEP Database in the CFM protocol) and then act upon these CCMs as if every reported connectivity fault is a legitimate indication of an actual fault. However, if one or more malicious CCMs are reported, there is currently no way in the CFM protocol to detect whether or not the received CCMs are legitimate. This, of course, can cause a great deal of chaos in a network and can cause the MEPs and other components within the network to react to spurious CCMs in a way that can have a negative impact on Ethernet services.

Therefore, there is a need in the field of communications networks, and particularly to sections of a network where the CFM protocol is being implemented, to overcome the current issues with CFM regarding security, trust, malicious behavior, etc. In this way, the embodiments of the present disclosure described below are configured to overcome the current CFM issues and provide solutions that reduce the negative impact that maliciously-created CCMs can have on Ethernet services.

BRIEF SUMMARY

The present disclosure is directed to embodiments that are configured to enhance link connectivity protocols utilized in a communications network. According to one implementation, a system includes a processing device, an isolated database, and a memory device. The memory device is configured to store a computer program having instructions that, when executed, enable the processing device to operate a Network Element (NE) in a safety mode associated with a link connectivity protocol that involves receiving one or more messages used for detecting link connectivity issues of an Ethernet service in a section of a network and responding to the link connectivity issues. In response to receiving the one or more messages used for detecting link connectivity issues while operating the NE in the safety mode, the instructions further enable the processing device to store the one or more messages as one or more untrusted messages in the isolated database without processing information in the one or more untrusted messages.

For example, the link connectivity protocol described herein may be the Connectivity Fault Management (CFM) protocol defined in IEEE 802.1Q, whereby the one or more messages may be considered to be Continuity Check Messages (CCMs). The section of the network may therefore be a Maintenance Association (MA) and the NE may therefore be a MA End Point (MEP). Furthermore, the instructions may also enable the processing device to report detection of the one or more CCMs stored in the isolated database, wherein reporting the detection may include sending one or more of a telemetry notification, an alarm report, a Simple Network Management Protocol (SNMP) trap, and a syslog message. According to some embodiments, this system may be incorporated in the NE itself. Additionally (or alternatively), this system may be incorporated in a Network Management System (NMS) or Operations, Administration, and Management (OAM) device operating in Layer 2 (Data Link Layer) and configured for controlling the NE and other NEs in the section of the network associated with the Ethernet service.

The system described above may further include an active database that is separate from the isolated database. The active database may be associated with an action triggering mode, whereby, in response to receiving the one or more messages used for detecting link connectivity issues while operating the NE in the action triggering mode, the instructions may further enable the processing device to store the one or more messages as one or more trusted messages in the active database. The processing device may also be configured to process the one or more trusted messages to detect the existence of one or more connectivity faults in the section of the network that would impact the Ethernet service. In response to detecting the existence of one or more connectivity faults, the processing device may perform a protective switching action to remediate the one or more connectivity faults. The instructions may further enable the processing device to a) present information regarding the one or more untrusted messages that are stored in the isolated database to a network administrator responsible for managing the Ethernet service in the network, b) present information regarding the one or more trusted messages that are stored in the active database to the network administrator, c) receive a transfer request from the network administrator to move a transferable message from the isolated database to the active database, or vice versa, and d) move the transferable message based on the transfer request to thereby control whether the transferable message is handled according to the safety mode or the action triggering mode. In some embodiments, the isolated database may include less storage capacity than the active database to thereby reduce a waste of storage resources and to reduce the severity of a database exhaustion attack.

The step of operating in the safety mode, as mentioned above, may be configured to reduce actions of a) reporting falsely-created messages regarding link connectivity issues of the Ethernet service, b) using excessive network resources, c) database exhaustion, d) falsely triggering connectivity faults, e) frame budget exhaustion, and/or f) unnecessary protection switching. In some embodiments, the instructions may further enable the processing device to utilize one or more of a time-based aging technique and a rollover technique with respect to the isolated database to thereby reduce steps related to the use of the isolated database.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
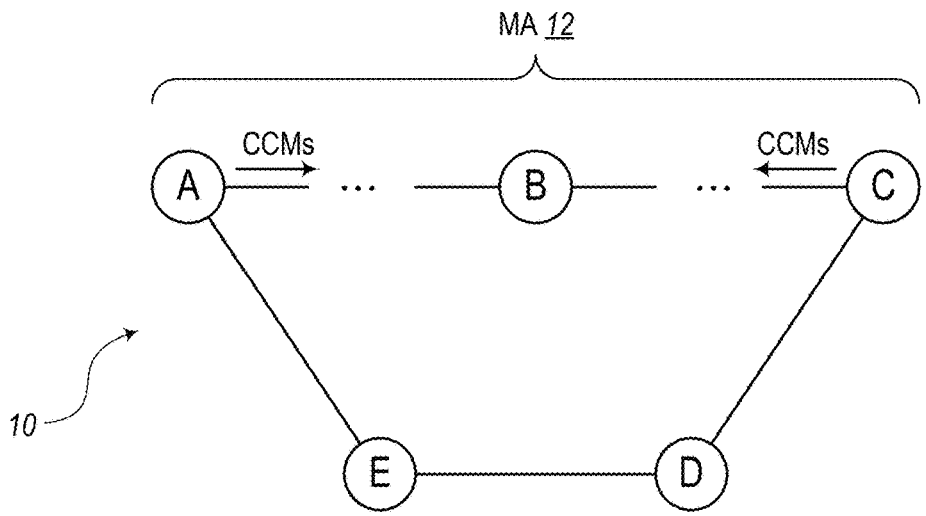
FIG. 1 is a diagram illustrating a communications network, according to various embodiments.

The present disclosure relates to systems and methods for providing security or safety enhancement to the Connectivity Fault Management (CFM) protocol defined in IEEE 802.1Q for Ethernet networks. The CFM protocol provides standards for detecting, verifying, and isolating connectivity failures. However, as mentioned above with respect to the current state of the CFM protocol, there is a security flaw with respect to the way in which Maintenance-association End Points (MEPs) are configured to handle Connectivity Check Messages (CCMs). The various embodiments of the present disclosure are configured to overcome these security flaws and provide an improvement or enhancement to the CFM protocol. In some respects, the embodiments described herein can be considered as a modification to CFM or may be considered as a new standard or protocol for operating within a similar type of communications network environment.

Again, the current problem in CFM is that the MEPs (or other similar Network Elements (NEs) operating in a network where messages are exchanged for the sake of detecting and remediating network faults) are designed as "always ON" receivers. The embodiments of the present disclosure provide a way to prevent (or at least reduce) the negative effects that spurious CCMs can have on Ethernet services. It has been recognized that an attacker could potentially exploit the CFM by tapping into a node or other section of a network, intercepting legitimate CCMs, and using the knowledge gained from these legitimate CCMs to insert malicious CCMs that could cause the MEPs to react to the CCMs as if they were legitimate messages from legitimate sources. With such malicious activity, it is possible that an attacker could bring down CFM services in the network.

Generally, the embodiments of the present disclosure are configured to provide a solution where a new database is included in a NE or MEP that handles CCMs from untrusted sources. Thus, a new level of security is added to CFM where a network operator or network administrator can view these "suspect" CCMs and determine whether they should be handled in the network or not. By storing the information of CCMs in this isolated database, the CCMs are not handled unless the network operator manually moves the messages to the MEP CCM Database, which is the database used for actively handling CCMs. Then, in the active database, the CCMs are handled as usual. Therefore, by providing a new database (e.g., the "isolated" database), the present disclosure is configured to establish two modes of operation. The first mode of operation is a safety mode, whereby CCMs are stored in the isolated database and handled with suspicion. The second mode of operation is the regular mode (or action triggering mode), whereby CCMs are stored in the active database (e.g., MEP CCM Database) and acted upon as legitimate CCMs for detecting for connectivity faults and performing remediation steps to overcome the connectivity faults. Thus, the embodiments of the present disclosure are configured to effectively handle a security vulnerability present in the current design of MEPs as per the CFM standard.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an example of a communications network 10. In this embodiment, the communications network 10 (e.g., Layer 2 network) includes a number of NEs or nodes (i.e., Node A, Node B, Node C, Node D, and Node E), which, for example, may form a G.8032 ring. Nodes A, B, and C in this embodiment may be part of a Maintenance Association (MA) 12 (or in a Maintenance Domain (MD)) as defined in the CFM protocol. Nodes A and C are positioned at the edges or ends of the MA 12 and may have Maintenance-association End Points (MEPs) configured over them. When operating in the MA 12 as MEPs in accordance with the CFM protocol, the Nodes A and C may multicast the CCMs as heartbeat messages to any suitable MAC address destinations configured as MEPs. Upon receiving these CCMs from other peer MEPs, each MEP can dynamically populate the CCMs in a database, referred to as a MEP CCM Database. Using the CCMs stored in the MEP CCM Database, the MEP can detect faults in an Ethernet service running in the network 10.

However, according to this example, suppose that Node B is a compromised node. For example, this node (i.e., Node B) may have been logged into by an unauthorized attacker or may have been maliciously utilized in some other manner for the intention of causing havoc in the MA 12. Also, suppose that the attacker has intercepted legitimate CCMs passed between the MEPs (i.e., Node A and Node C), and then acted in a way to insert malicious CCMs into the MA 12. These malicious CCMs may be created in a way to deceive either or both of the MEPs into believing that the CCMs are legitimate, causing Node A and/or Node C to react in a way that might unnecessarily use network resources, redirect traffic through an already busy section of the network 10, or cause other types of havoc in the network 10.

Since CFM has a security vulnerability whereby each MEP is configured to be "always ON" for reception of CCMs from peer MEPs, each respective MEP will then add the peer MEP entry to its MEP CCM Database and then, as designed, will be configured to act upon these entries. This design flaw can be easily exploited by an attacker to carry out various attacks on CFM services.

According to one potential attack scenario, CFM services may already be successfully configured on the MA 12 of the network 10 and communications may be running properly. Suppose an attacker gains access to a system (e.g., Node B) that is acting as a pass-through for passing CCMs through itself for some CFM services. The attacker can snoop, intercept, or perform a sniffing attack on those CCMs, generate its own CCM packets, and then inject them on the same ports. Normally, according to typical CFM operation, the other genuine MEPs (i.e., present on Nodes A and C) will receive the attacker's CCMs and dynamically add an entry for them in the MEP CCM Database. At this point, the attacker could trigger any number or types of attacks to bring down the CFM service running between Nodes A and C.

In order to overcome this security deficiency in the CFM protocol, the MEPs (i.e., Nodes A and C), according to the various implementations of the present disclosure, may be configured with a database in addition to the normal MEP CCM Database. This new database may be referred to herein as an "isolated" database and is configured to isolate the CCM entries before acting upon these entries. The added level of security in the present disclosure allows two different modes of operation, which does not exist in the current CFM protocol. The MEP may be operated in a secure or safety mode, which includes utilizing the isolated database for storing new CCMs. These new CCMs can later be transferred to the regular MEP CCM Database for normal CFM operation. When operating in the active mode, the MEP stores CCMs in the MEP CCM Database to allow the normal CFM operation.

Figure 2:
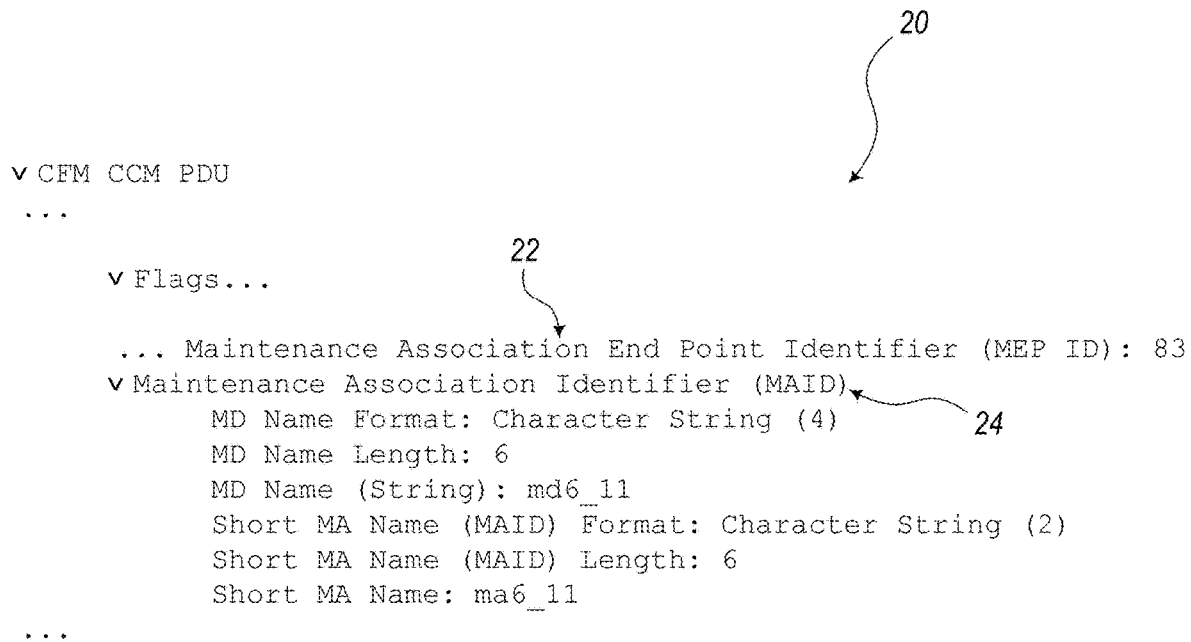
FIG. 2 is a diagram illustrating a portion of a Connectivity Check Message (CCM) transmitted in the communications network of FIG. 1, according to various embodiments.

FIG. 2 is a diagram illustrating an example of a portion of the code included in a CCM 20. For example, the CCM 20 may be transmitted between the MEPs (i.e., Node A and Node C) of the communications network 10 of FIG. 1. In this example, the CCM 20 may include, among other things, a Maintenance Association End Point Identifier (MEP ID) 22 and a Maintenance Association Identifier (MAID) 24. The MEP ID 22 is a unique identifier for identifying a particular MEP (e.g., Node A) that may be multicasting the CCM 20 in the MA 12. As shown, the MEP ID 22 (e.g., for Node A) includes an arbitrary value of "83."

The MAID 24 is used to identify the MA 12 in which the MEPs communicate according to the CFM protocol. For example, the MAID 24 may include six fields, such as a Maintenance Domain (MD) Name Format, an MD Name Length, an MD Name (String), a Short MA Name Format, a Short MA Name Length, and a Short MA Name, where the MD may include the entire network 10. The end of the MAID 24, after the six fields, may include zero padding (e.g., a certain number of zeros) to separate the MAID 24 from the next part of the CCM 20 and to make the size of MAID equal to the CFM standard defined 48 bytes by preforming zero padding.

Therefore, if an attacker is able to snoop, sniff, or intercept the CCM 20, the attacker would be able to see at least the MEP ID 22 and MAID 24 related to legitimate values in the MA 12. By snooping, the attacker can have spurious CCMs added to the MEP CCM Database (RMEP DB) of the MEPs to trigger various types of attacks. The following are examples of four different types of attacks that may be problematic with conventional CFM operation, but those which the embodiments of the present disclosure are configured to prevent completely, to significantly reduce, and/or to minimize the severity of:

1. MEP CCM Database (DB) Exhaustion: Attacker can send different CCMs with different MEP IDs 22 to fill up or flood the RMEP DB with junk entries.
2. CFM Fault Triggering: Creating faults and clearing repeatedly. The attacker can manipulate or stop sending CCMs and can falsely trigger various different types of fake CFM faults and alarms for the genuine CFM services.
3. Frame Budget exhaustion attack: The attacker may intentionally target a MEP that has the lowest CCM interval (e.g., 3.33 ms). It can then flood that MEP with multiple RMEP entries with the same interval. This will cause the CPU of this MEP to process a much higher number of CCMs as usual to unnecessarily increase CPU load, thereby using up the frame budget (i.e., the number of packets that can be handled per second) for the device. The exhaustion of frame budget (e.g., overloading the CPU) will impact all the OAM services present on the device.
4. Denial of Service (DOS) attack in a Protection Switching Environment: The CFM services can also be used to provide faster protection switching by binding them to G.8032 ring segments (e.g., communications network 10). The attacker can trigger protection switching to a protection route (e.g., through Nodes E and D of FIG. 1) in such a network by creating CFM faults. The attacker can use this process to target a particular device (e.g., Node E) and carry most of the traffic through it to overload it and cause traffic drops.

The MEP ID 22 of the CCM 20 is unique to each MEP. The MAID 24 (including the six fields) will be the same for every CCM communicated within the MA 12 for a particular service. If a CCM (e.g., CCM 20) does not have the same values for each of the six fields, the CCM will not be recognized by other MEPs and/or is not a valid service. If the values in the MAID 24 are the same for a new CCM, then the CCM will be added to the MEP CCM Database. Otherwise, if the values are not the same, the CCM will not be added to the MEP CCM Database.

Figure 3:
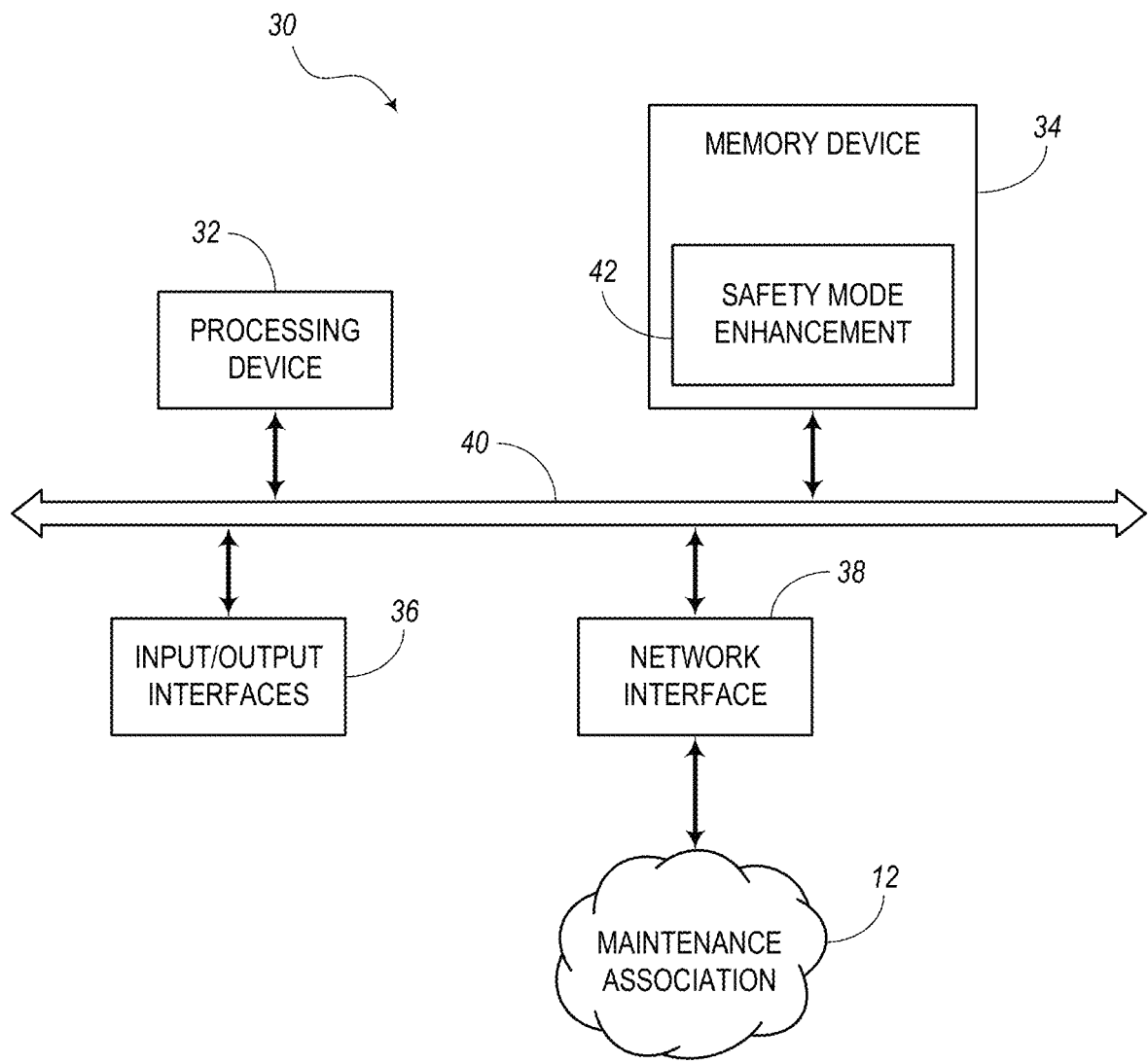
FIG. 3 is a block diagram illustrating a Network Management System (NMS) or an Operations, Administration, and Management (OAM) system for enabling enhancements to the Connectivity Fault Management (CFM) protocol, according to the various embodiments of the present disclosure.

FIG. 3 is a block diagram illustrating an embodiment of a Network Management System (NMS) 30 (e.g., an Operations, Administration, and Management (OAM) system or the like) for enabling enhancements to the CFM protocol. For example, the NMS 30 may be a digital computing device configured to operate in Layer 2 of the communications network 10. The NMS 20 may be configured to control or manage Network Elements (NEs) or nodes in a Maintenance Association (e.g., MA 12), such as Nodes A, B, and C.

As illustrated, the NMS 30 may include a processing device 32, a memory device 34, Input/Output (I/O) interfaces 36, and a network interface 38, interconnected with each other via a local interface 40. For example, the network interface 38 may be in communication with the NEs of the MA 12 for adding a security layer to CFM operation. The NMS 30 also includes a safety mode enhancement 42, which may be implemented in software or firmware in the memory device 34 and/or implemented in hardware in the processing device 32. In some embodiments, the safety mode enhancement 42 may operation in conjunction with compatible elements in the NEs for enhancing the CFM protocol.

Figure 4:
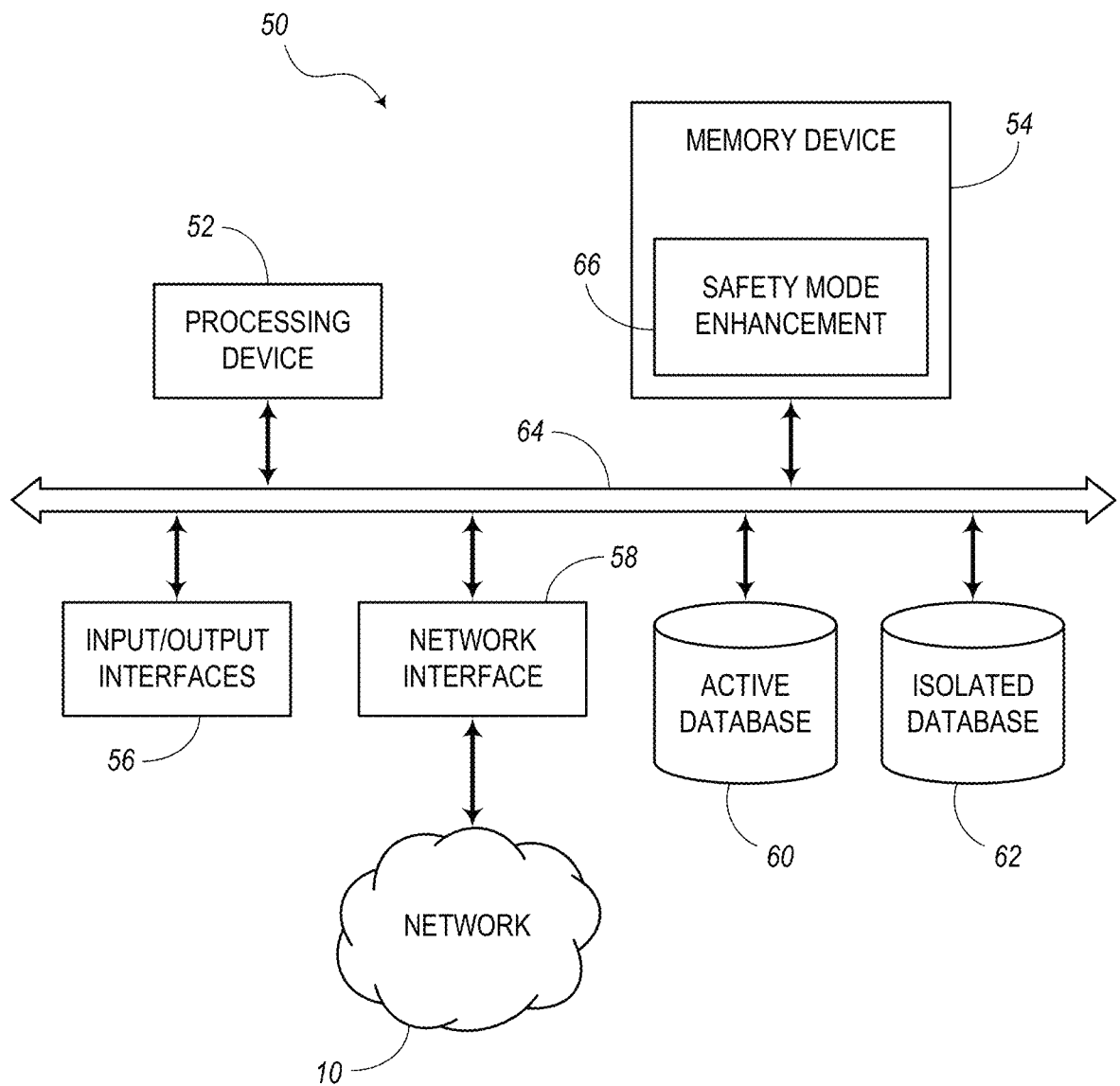
FIG. 4 is a block diagram illustrating a Network Element (NE) for enabling enhancements to the CFM protocol, according to various embodiments of the present disclosure.

FIG. 4 is a block diagram illustrating an embodiment of a NE 50 for enabling enhancements to the CFM protocol within the network 10. In the illustrated embodiment, the NE 50 may be a digital computing device that generally includes a processing device 52, a memory device 54, Input/Output (I/O) interfaces 56, a network interface 58, an active database 60, and an isolated database 62, each interconnected with each other via a local interface 64. The NE 50 also includes a safety mode enhancement 66, which may be implemented in software or firmware in the memory device 54 and/or implemented in hardware in the processing device 52 and may operate with the safety mode enhancement 42 of the NMS 30, according to various embodiments.

It should be appreciated that FIGS. 3 and 4 depict the NMS 30 and NE 40, respectively, in a simplified manner, where some embodiments may include additional components and suitably configured processing logic to support known or conventional operating features. The components of each device may be communicatively coupled via the respective local interface 40, 64. Each local interface 40, 64 may include, for example, one or more buses or other wired or wireless connections. The local interfaces 40, 64 may also include controllers, buffers, caches, drivers, repeaters, receivers, among other elements, to enable communication. Further, the local interfaces 40, 64 may include address, control, and/or data connections to enable appropriate communications among the respective components.

It should be appreciated that the processing devices 32, 52, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing devices 32, 52 may also include or utilize stored program instructions (e.g., stored in hardware, software, and/or firmware) for control of the NMS 30 and NE 50, respectively, by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory devices 34, 54 may each include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory devices 34, 54 may incorporate electronic, magnetic, optical, and/or other types of storage media. The memory devices 34, 54 may have a distributed architecture, where various components are situated remotely from one another, but can be accessed by the respective processing devices 32, 52.

The memory devices 34, 54 may each include a data store, database, or the like, for storing data. In one example, the data store may be located internal to the NMS 30 or NE 50 and may include, for example, an internal hard drive connected to the respective local interfaces 40, 64. Additionally, in another embodiment, the data store may be located external to the NMS 30 or NE 50 and may include, for example, an external hard drive connected to the Input/Output (I/O) interfaces 36, 56, respectively (e.g., SCSI or USB connection). In a further embodiment, the data store may be connected to the NMS 30 or NE 50 through a network and may include, for example, a network attached file server.

Software stored in the memory devices 34, 54 may include one or more programs, each of which may include an ordered listing of executable instructions for implementing logical functions. The software in each of the memory devices 34, 54 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing devices 32, 52), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 32, 52 or other suitable circuitry or logic). For example, when executed, the instructions may cause or enable the processing device 32, 52 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 32, 52), or any suitable combination thereof. Software/firmware modules may reside in the memory device 34, 54, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 36, 56 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 36, 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interfaces 38 and 58 may be used to enable the NMS 30 and NE 50, respectively, to communicate over a network, such as the network 10, the Internet, a Wide Area Network (WAN), a Local Area Network (LAN), and the like. The network interfaces 38, 58 may each include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 38, 58 may each include address, control, and/or data connections to enable appropriate communications on the network 10.

Therefore, according to the various embodiments of the present disclosure, a system may include a processing device 32, 52, an isolated database 62, and a memory device 34, 54 configured to store a computer program (e.g., safety mode enhancements 42, 66). For example, the computer program may include instructions that, when executed, enable the processing device 32, 52 to operate a NE (e.g., NE 50, Node A, Node C, etc.) in a safety mode associated with a link connectivity protocol that involves receiving one or more messages used for detecting link connectivity issues of an Ethernet service in a section of a network and responding to the link connectivity issues. In response to receiving the one or more messages used for detecting link connectivity issues while operating the NE in the safety mode, the instructions may further enable the processing device 32, 52 to store the one or more messages as one or more "untrusted" messages in the isolated database 62 without processing information in the one or more untrusted messages.

Accordingly, the link connectivity protocol mentioned above, for example, may be the Connectivity Fault Management (CFM) protocol defined in IEEE 802.1Q. Also, the one or more messages, for example, may be one or more Continuity Check Messages (CCMs). Also, the section of the network, for example, may be a Maintenance Association (MA), such as MA 12, and the NE 50 may be a Maintenance-association End Point (MEP).

Furthermore, this system may further include an active database (e.g., active database 60) that is separate from the isolated database 62. For example, the active database 60 may be associated with an action triggering mode. In response to receiving the one or more messages used for detecting link connectivity issues while operating the NE 50 in the action triggering mode, the instructions may further enable the processing device 32, 52 to store the one or more messages as one or more trusted messages in the active database 60. The instructions (e.g., of the safety mode enhancement 42, 66) may further enable the processing device 32, 52 to process the one or more trusted messages to detect for the existence of one or more connectivity faults in the section of the network that would impact the Ethernet service. In response to detecting the existence of one or more connectivity faults, the processing device 32, 52 may be configured to perform a protective switching action to remediate the one or more connectivity faults, such as by switching to a protection path through Nodes E and D. The instructions may further enable the processing device 32, 52 to present information (e.g., on a Graphical User Interface (GUI) or other O/I interface 36, 56) regarding the one or more untrusted messages that are stored in the isolated database 62 to a network administrator responsible for managing the Ethernet service in the network 10. The processing device 32, 52 also presents information regarding the one or more trusted messages that are stored in the active database 60 to the network administrator. Then, if the processing device 32, 52 receives a transfer request from the network administrator to move a transferable message from the isolated database to the active database (or vice versa), the processing device 32, 52 moves the transferable message based on the transfer request (i.e., from the isolated database 62 to the active database 60 or from the active database 60 to the isolated database 62) to thereby control whether this transferred message is to be handled according to the safety mode (e.g., secure mode, untrusted mode, distrustful mode, untrusting mode, etc.) or the action triggering mode (e.g., a trusted mode, trusting mode, etc.). In some embodiments, the isolated database 62 may include less storage capacity than the active database 60 to thereby reduce a waste of storage resources and to reduce the severity of a database exhaustion attack.

Figure 5:
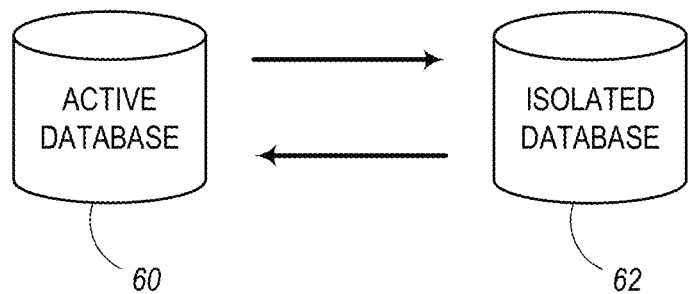
FIG. 5 is a diagram illustrating an example of data transfer between two different databases, according to various embodiments of the present disclosure.

FIG. 5 shows an embodiment of data transfer between the active database 60 and the isolated database 62. For example, the user may move CFM-based entries from one database to the other, such as by entering requests via the I/O interfaces 36, 56. Moving the entries from one database to another will thereby change how those entries are processed. If the system 30, 50 is in a safety mode and entries are automatically placed in the isolated database 62, the user can review the entries and then move them to the active database 60 when appropriate. If the system 30, 50 is in an action triggering mode and entries are automatically placed in the active database 60, the user can review the entries being processed and move them to the isolated database 62 when appropriate.

In the action triggering (trusting) mode, all the received CCMs will be learned and added to the active database 60 for normal CFM functionality. In the safety (untrusting) mode, the CCMs will be learned and updated in this unique isolated database 62. The system 30, 50 can report the learning of CCMs in the isolated database 62 via a telemetry notification, alarm report, syslog message, etc. The user (e.g., network operator, network administrator, technician, engineer, etc.) can be given an option to move the entries (e.g., untrusted entries) from the isolated database 62 to the active database 60 when the user determines that the previously unknown entries are verified as legitimate. In some embodiments, the user can also be given the option to move entries in the opposite direction (i.e., from the active database 60 to the isolated database 62), such as, for example, when the user determines that the entries that were previously viewed as trustworthy are actually found to be untrustworthy. According to some embodiments, the CFM faults may then be reported only when it is determined, from the entries populating the active database 60, that the entries are indicative of CFM faults. Thus, entries in the isolated database 62 will not be processed, but may be held in this database until the user can determine if the entries are legitimate. If they are found to be legitimate, the entries can be moved to the active database 60 where they can be processed or they can be deleted from the isolated database 62 or simply left in the isolated database 62 and ignored. Thus, the entries in the isolated database 62 will not be allowed to trigger CFM faults.

To prevent the hogging of resources, the isolated database 62 may be configured in the system 30, 50 with a smaller size than the size of the active database 60. The isolated database 62 may be smaller in order to prevent the RMEP DB exhaustion attack mentioned above. Additionally, the safety mode enhancement 42, 66 may include database organizational functionality for controlling entries in the isolated database 62. For example, the database organizational functionality may include features for searching through the entries and getting rid of the oldest using a First In, First Out (FIFO) technique or other suitable strategies. The isolated database 62 may therefore be organized using a feature such as time-based aging of entries, rollover of entries, and the like, for maintaining the latest data in the isolated database 62 and minimizing resource usage.

Therefore, the embodiments of the present disclosure are shown to solve the problems that may arise with respect to conventional CFM operation. For example, the services may initially be configured in the trusted mode of operation (i.e., action triggering mode) and all the genuine CCMs are learned in the active database 50. After successful operation in the action triggering mode, the system 30, 50 may change the mode of operation of the NE 50 to the safety mode. Then, if an attacker gains control of a network device and sends its CCMs in the network, the NE 50 is configured to receive these CCMs and create an entry for the CCMs in the isolated database 62. When entries newly populate the isolated database 62, the safety mode enhancement 42, 66 may be configured to report the CCM entry or report a learning of an untrusted MEP. This reporting may include sending a telemetry notification, an alarm report, a syslog message, or other suitable notification to the network operator or network operators of this MEP and/or other MEPs in the network.

Also, once the network operator receives the indication of newly received CCMs in the isolated database 52, the network operator can check the entries and take further action as needed. If the entries are legitimate, the network operator can move the entries to the active database 60 for processing. Meanwhile, the genuine services are allowed to continue functioning normally and will not get impacted by this attack. The CCMs learned in the isolated database 62 are not allowed to have the full CFM functionality and thus will not be allowed to create CFM faults. It may be noted that the safety mode of operation might be enabled on devices after the trusted configuration is done in order to prevent attacks on the CFM services.

Figure 6:
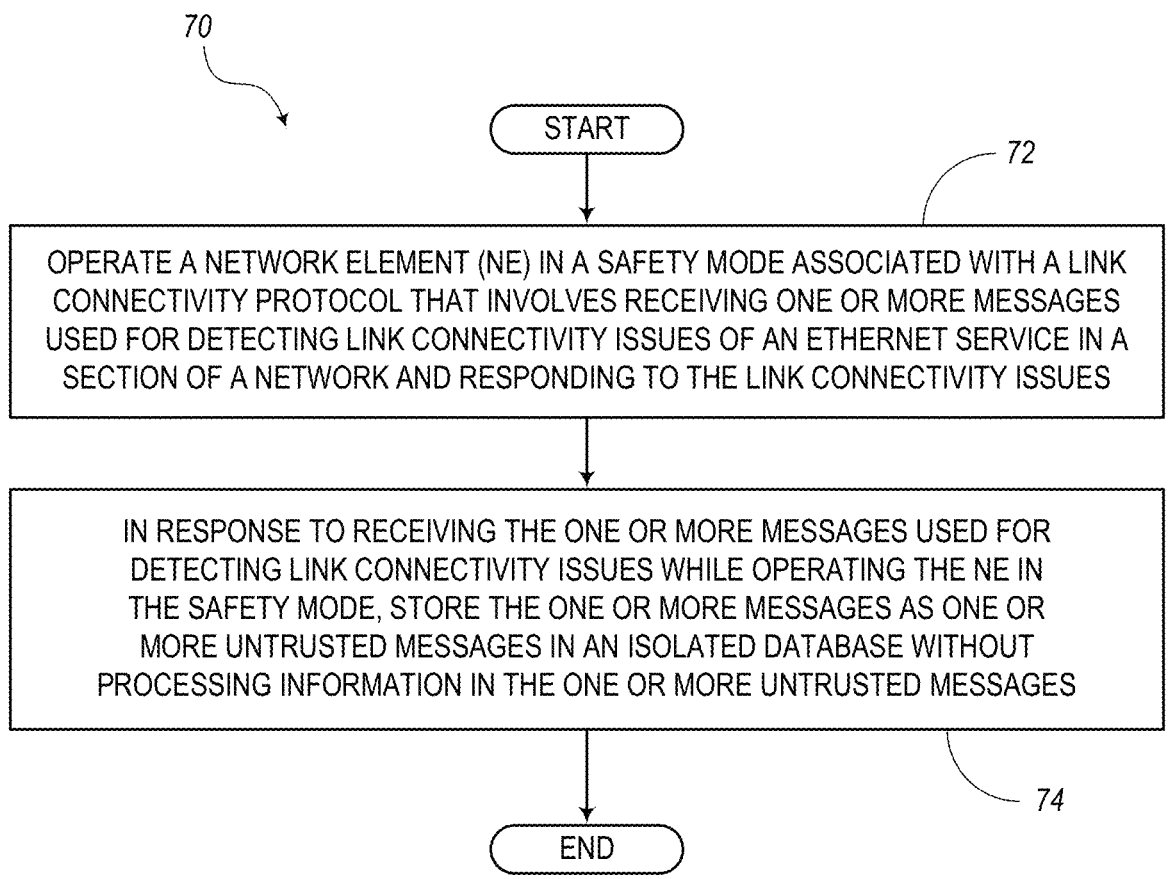
FIG. 6 is a flow diagram illustrating a process for enabling a safety mode in the CFM protocol, according to various embodiments of the present disclosure.

FIG. 6 is a flow diagram illustrating an embodiment of a process 70 for enabling a safety mode in the CFM protocol. In this embodiments, the process 70 includes the step, as indicated in block 72, of operating a Network Element (NE) in a safety mode associated with a link connectivity protocol, wherein the link connectivity protocol involves receiving one or more messages used for detecting link connectivity issues of an Ethernet service in a section of a network and responding to the link connectivity issues. In response to receiving the one or more messages used for detecting link connectivity issues while operating the NE in the safety mode, the process 70 further includes the step of storing the one or more messages as one or more untrusted messages in the isolated database without processing information in the one or more untrusted messages, as indicated in block 74.

The process 70 described above may also be further defined, whereby the link connectivity protocol may be the CFM protocol defined in IEEE 802.1Q. Also, the one or more messages may be one or more Continuity Check Messages (CCMs). The section of the network described above may be a Maintenance Association (MA), and the NE may be a Maintenance-association End Point (MEP). The process 70 may further include the step of reporting detection of the one or more CCMs stored in the isolated database (to the same NE or one or more other NEs operating in the section of the network). For instance, reporting the detection may include sending a telemetry notification, an alarm report, a syslog message, and/or other types of messages (e.g., to a network administrator). The process 70 may also include software logic (e.g., CFM modifications, safety mode enhancements 42, 66, or the like), which may be incorporated in the NE 50 itself, a Network Management System (NMS) (e.g., NMS 30), and/or some other control device, such as an Operations, Administration, and Management (OAM) device operating in Layer 2 (Data Link Layer) and configured for controlling the NE and other NEs in the section of the network associated with the Ethernet service.

An active database (e.g., active database 60) may also be configured in the NE 50 or NMS 30, which may be separate from the isolated database 62 and may be associated with an action triggering mode. In response to receiving the one or more messages used for detecting link connectivity issues while operating the NE in the action triggering mode, the process 70 may further include the step of storing the one or more messages as one or more trusted messages in the active database. The process 70 may include analyzing the one or more trusted messages to detect for the existence of one or more connectivity faults in the section of the network that would impact the Ethernet service. In response to detecting the existence of one or more connectivity faults, the process 70 may perform a protective switching action to remediate the one or more connectivity faults. In some embodiments, the process 70 may further include the steps of a) presenting information regarding the one or more untrusted messages that are stored in the isolated data to a network administrator responsible for managing the Ethernet service in the network, b) presenting information regarding the one or more trusted messages that are stored in the active database to the network administrator, c) receiving a transfer request from the network administrator to move a transferable message from the isolated database to the active database, or vice versa, and d) moving the transferable message based on the transfer request to thereby control whether the transferable message is handled according to the safety mode or the action triggering mode. The isolated database, for example, may include less storage capacity than the active database to thereby reduce a waste of storage resources and to reduce the severity of a database exhaustion attack.

The step of operating in the safety mode (block 72) may be performed in order to reduce the actions of a) reporting falsely-created messages regarding link connectivity issues of the Ethernet service, b) using excessive network resources, c) database exhaustion, d) falsely triggering connectivity faults, e) frame budget exhaustion, f) unnecessary protection switching, and/or other problematic actions. The process 70 may further include the step of utilizing one or more of a time-based aging technique and a rollover technique with respect to the isolated database to thereby reduce steps related to the use of the isolated database.

The new features or modifications to CFM may be configured to provide certain restrictions on the ability of new CCMs to generate CFM faults while operating in the safety mode. There may be no restriction, for example, in the trusted mode (e.g., action triggering mode). In the trusted mode, the NE may be always on and can receive any CCM, including those that may potentially be malicious ones. In the untrusted mode, all CCMs are treated with suspect and the user needs to approve them before they can take effect. In some cases, the operator may choose to start off in the trusted mode to get the trustworthy CCMs and then may choose to switch to the untrusted mode. In other cases, the operator may choose to always be in the untrusted mode, whereby the user would need to authorize CCMs as they come in. In some respects, this may be similar to two factor authentication (2FA), Multi-Factor Authentication (MFA), etc., where additional authorization is needed for approval. The untrusted mode may also be referred to as "zero trust," which is a new technique or model in the realm of CFM operation, whereby every CCM would be considered untrustworthy.

Therefore, the enhancements to CFM described in the present disclosure may include various benefits. For example, many existing network devices may suffer from the security vulnerability described herein. The present solutions make the CFM implementation in NEs more resilient to network attacks. The safety mode enhancements 42, 66 may be incorporated as a part of the CFM standard's security recommendations, whereby vendor that intends to design their CFM services as per the standard might utilize the functionality described in the present disclosure. The implementations may be included in Layer 2 (L2) service supporting devices that run CFM, which may include devices from various vendors.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processors to perform steps of:
   receiving one or more messages associated with a link connectivity protocol for detecting link connectivity issues of an Ethernet service in a section of a network and responding to the link connectivity issues; and
   maintaining two databases for learning nodes in the network based on the received one or more messages, the two databases including an active database and an isolated database.

2. The non-transitory computer-readable medium of claim 1, wherein the steps further include
   storing new nodes learned from the received one or more messages in the isolated database; and
   moving any nodes in the isolated database to the active database based on feedback.

3. The non-transitory computer-readable medium of claim 1, wherein the steps further include
   detecting faults based on the received one or more messages and only reporting the faults based on the active database.

4. The non-transitory computer-readable medium of claim 3, wherein the detecting faults is based on failure to receive the corresponding messages from a given node in the network.

5. The non-transitory computer-readable medium of claim 1, wherein the receiving one or more messages include
   receiving a new message from a new node in the network and storing the new node in the isolated database; and
   providing a notification of the new node.

6. The non-transitory computer-readable medium of claim 5, wherein the steps further include
   receiving feedback based on the notification and moving the new node to the active database.

7. The non-transitory computer-readable medium of claim 1, wherein the isolated database has a smaller size than the active database.

8. The non-transitory computer-readable medium of claim 1, wherein the steps further include
   aging out nodes in the isolated database where such nodes are removed based on failure to receive a message in a corresponding time.

9. A network element comprising circuitry configured to:
   receive one or more messages associated with a link connectivity protocol for detecting link connectivity issues of an Ethernet service in a section of a network and responding to the link connectivity issues, and
   maintain two databases for learning nodes in the network based on the received one or more messages, the two databases including an active database and an isolated database.

10. The network element of claim 9, wherein the circuitry is further configured to
store new nodes learned from the received one or more messages in the isolated database, and
move any nodes in the isolated database to the active database based on feedback.

11. The network element of claim 9, wherein the circuitry is further configured to
detect faults based on the received one or more messages and only reporting the faults based on the active database.

12. The network element of claim 11, wherein the detecting faults is based on failure to receive the corresponding messages from a given node in the network.

13. The network element of claim 9, wherein the circuitry is further configured to
receive a new message from a new node in the network and storing the new node in the isolated database, and
provide a notification of the new node.

14. The network element of claim 9, wherein the circuitry is further configured to
age out nodes in the isolated database where such nodes are removed based on failure to receive a message in a corresponding time.

15. A method comprising steps of:
receiving one or more messages associated with a link connectivity protocol for detecting link connectivity issues of an Ethernet service in a section of a network and responding to the link connectivity issues; and
maintaining two databases for learning nodes in the network based on the received one or more messages, the two databases including an active database and an isolated database.

16. The method of claim 15, wherein the steps further include
storing new nodes learned from the received one or more messages in the isolated database; and
moving any nodes in the isolated database to the active database based on feedback.

17. The method of claim 15, wherein the steps further include
detecting faults based on the received one or more messages and only reporting the faults based on the active database.

18. The method of claim 15, wherein the receiving one or more messages include
receiving a new message from a new node in the network and storing the new node in the isolated database; and
providing a notification of the new node.

19. The method of claim 18, wherein the steps further include
receiving feedback based on the notification and moving the new node to the active database.

20. The method of claim 15, wherein the steps further include
aging out nodes in the isolated database where such nodes are removed based on failure to receive a message in a corresponding time.

* * * * *